United States Patent [19]

Salmonowicz et al.

[11] Patent Number: 5,762,394
[45] Date of Patent: Jun. 9, 1998

[54] VEHICLE DOOR WITH STRUCTURAL PLASTIC INNER PANEL

[75] Inventors: Mark Stephen Salmonowicz, Royal Oak; Carl Henry Visconti, Clarkston; Suresh Deepchand Shah, Troy; Harry Duane Miller, Canton, all of Mich.

[73] Assignee: General Motors Corporation, Detroit, Mich.

[21] Appl. No.: 598,826

[22] Filed: Feb. 2, 1996

[51] Int. Cl.$^6$ ........................................... B60J 5/04
[52] U.S. Cl. .................. 296/146.5; 296/146.6; 296/901; 49/502
[58] Field of Search ............ 296/146.5, 146.6, 296/146.7, 145, 901; 49/502, 501, 503, 504; 52/784.1, 630

[56] References Cited

U.S. PATENT DOCUMENTS

| | | | |
|---|---|---|---|
| 4,945,682 | 8/1990 | Altman et al. | 296/146.5 |
| 5,308,138 | 5/1994 | Hlavaty | 49/502 |
| 5,355,629 | 10/1994 | Kimura et al. | 49/502 |
| 5,536,060 | 7/1996 | Rashid et al. | 296/146.6 |

*Primary Examiner*—Stephen Gordon
*Attorney, Agent, or Firm*—Charles E. Leahy

[57] ABSTRACT

A vehicle door assembly according to the invention includes a structural framework, including a rear end for mounting a latch, a front end for mounting a hinge and a beam portion extending between the front and rear ends. An outer door panel is provided for mounting on the structural framework to provide the outer surface of the door assembly. A structural inner panel is provided for mounting on the structural framework and is of molded plastic and has a generally planar trim wall facing toward the occupant compartment and edge wall portions which extend transverse to the planar trim wall to thereby envelope the structural framework within the structural inner panel. The structural inner panel has integrally molded hollow tubular stiffening structures molded therein by a gas injection molding process and which extend substantially all around the periphery of the door so that the molded plastic inner panel is substantially structurally self-supporting and contributing to the structural integrity of the door assembly. The integrally molded hollow tubular stiffening structure is preferably located substantially at the juncture between the planar trim wall and the edge wall portions. Additional stiffening structure is obtained by also integrally molding the hollow tubular stiffening structure at least partially around the periphery substantially at the terminal edge of the edge wall portion.

4 Claims, 5 Drawing Sheets

VEHICLE DOOR WITH STRUCTURAL PLASTIC INNER PANEL

The invention relates to vehicle door assembly and, more particularly, provides a structural inner panel of molded plastic having integrally molded hollow tubular stiffening structures extending around the periphery of the door.

BACKGROUND OF THE INVENTION

It is well known in motor vehicles to provide a door having a forward end which is hinged to the vehicle body and a rear end which is latched to the body by a door latch.

Such vehicle doors traditionally include a metallic inner panel and metallic outer panel which are connected together around their edges and define therebetween a cavity for housing the door latch, window regulator and other mechanisms associated with the door. The prior art has recognized the advantage of using a plastic panel for the outer panel, in which case, the structural strength of the vehicle door is provided by the inner panel and by beams or the like which extend longitudinally inside the cavity. The prior art has also recognized that the inner panel of the door should be covered with a trim panel to conceal and close out any openings or other unsightliness of the door inner panel. The inner trim panel of the prior art can be a molded plastic which has an aesthetically pleasing surface treatment or the trim panel may be comprised of a wood or plastic substrate panel covered by a sheet material such as vinyl or cloth.

It would be desirable to provide a vehicle door having a molded plastic inner panel possessing sufficient structural strength to obviate the need for a separate metal door inner panel underlying the trim panel.

SUMMARY OF THE INVENTION

A vehicle door assembly according to the invention includes a structural framework, including a rear end for mounting a latch, a front end for mounting a hinge and a beam portion extending between the front and rear ends. An outer door panel is provided for mounting on the structural framework to provide the outer surface of the door assembly. A structural inner panel is provided for mounting on the structural framework and is of molded plastic and has a generally planar trim wall facing toward the occupant compartment and edge wall portions which extend transverse to the planar trim wall to thereby envelope the structural framework within the structural inner panel. The structural inner panel has integrally molded hollow tubular stiffening structures molded therein by a gas injection molding process and which extend substantially all around the periphery of the door so that the molded plastic inner panel is substantially structurally self-supporting and contributing to the structural integrity of the door assembly. The integrally molded hollow tubular stiffening structure is preferably located substantially at the juncture between the planar trim wall and the edge wall portions. Additional stiffening structure is obtained by also integrally molding the hollow tubular stiffening structure at least partially around the periphery substantially at the terminal edge of the edge wall portion.

BRIEF DESCRIPTION OF THE DRAWINGS

These and other features, objects and advantages of the invention will become apparent upon consideration of the Description of the Preferred Embodiment and the appended drawings in which.

DESCRIPTION OF THE PREFERRED EMBODIMENT

Figure 1:
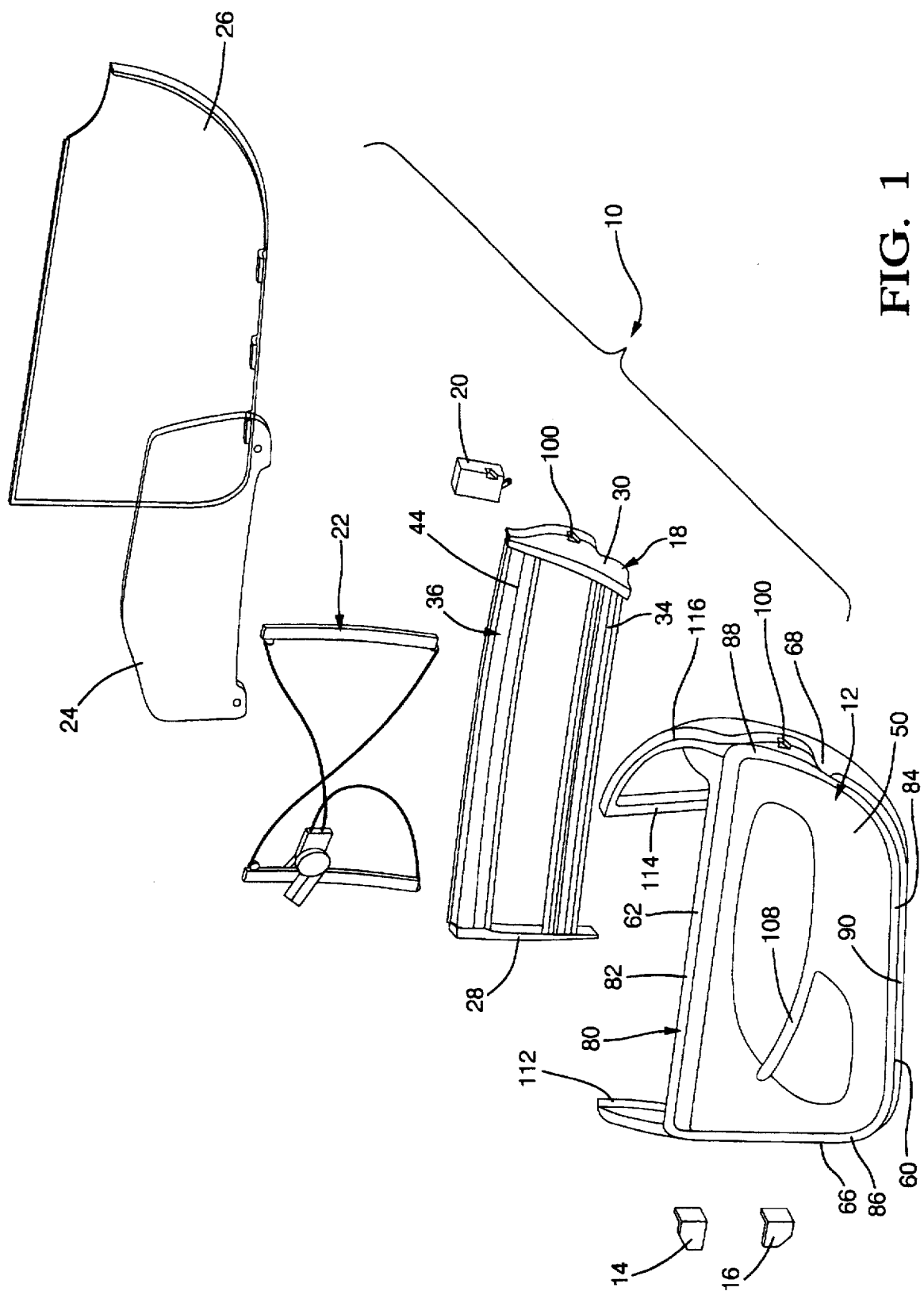
FIG. 1 is a perspective exploded view of a vehicle door according to the invention.

Referring to FIG. 1, it is seen that the vehicle door assembly 10 includes a structural inner panel 12, hinges 14 and 16, a structural framework 18, a door latch 20, a window regulator 22, a window glass 24, and an outer panel 26.

As seen in the drawings, the structural framework 18 is comprised of a plurality of sheet metal stampings which are welded together in a generally rectangular shape. These stampings include a front vertical 28 and a rear vertical 30 which are connected together by a longitudinally extending lower beam 34 and longitudinally extending upper beams 36 and 38. The upper beam 36 is comprised of panels 42 and 44 which are welded together.

Figure 3:
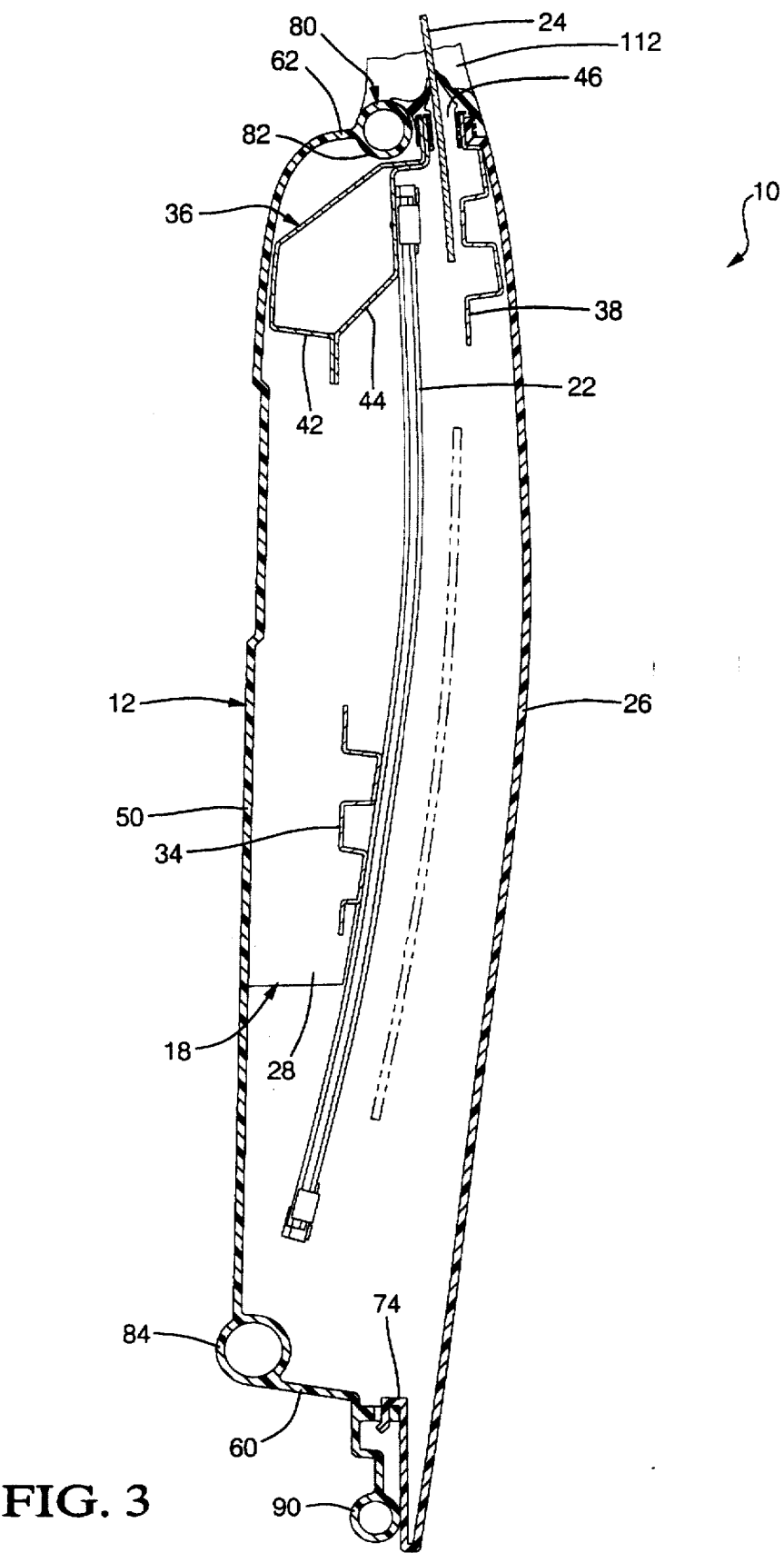
FIG. 3 is a section view taken in the direction of arrows 3—3 of FIG. 2.

As seen in FIG. 3, the window regulator assembly 22 is suitably mounted on the upper beam 36 and the lower beam 34 to raise and lower the window glass 24 through the slit 46 between the upper beams 36 and 38. The structural inner panel 12 is formed via a gas assisted injection molding process and includes a generally planar trim wall 50. As best seen in FIG. 3, the structural inner panel 12 also includes a lower edge wall portion 60 which is integral with the planar trim wall 50 and extends step-wise in the direction generally transverse to the planar trim wall 50 and also includes a top edge wall portion 62 which extends transversely into proximity with the window glass 24 and defines a window sill.

Figure 4:
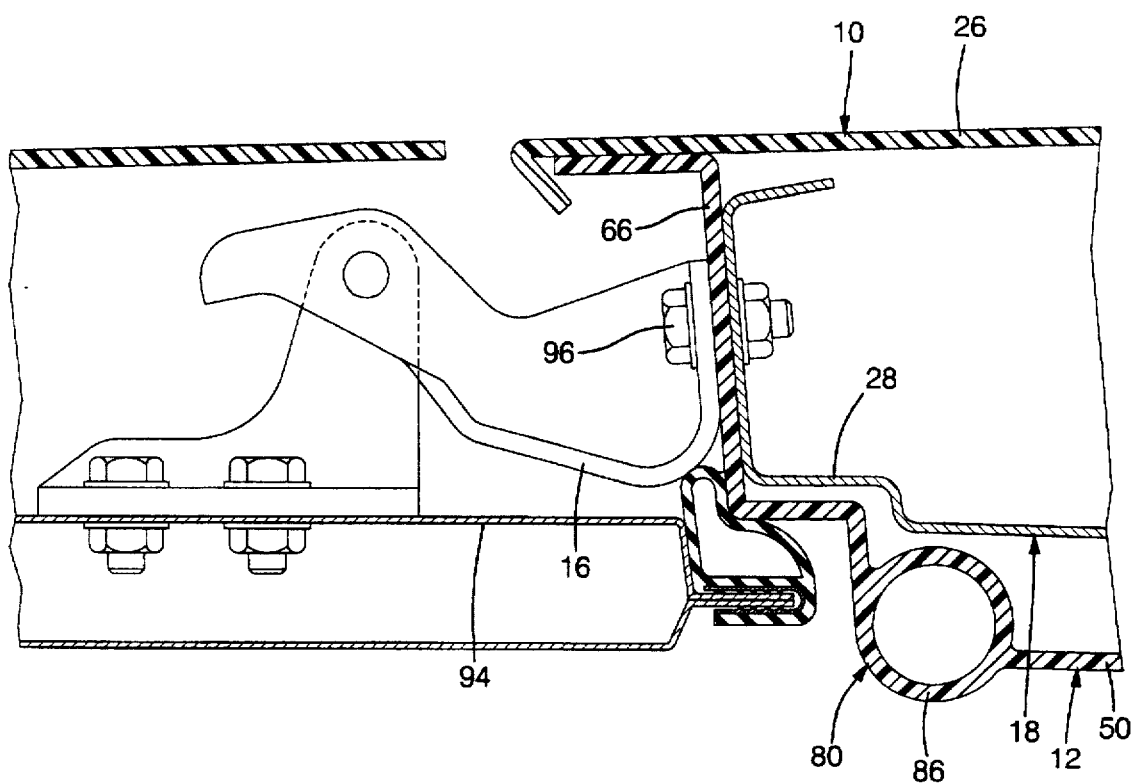
FIG. 4 is a section view through a hinge and taken in the direction of arrows 4—4 of FIG. 2.
Figure 5:
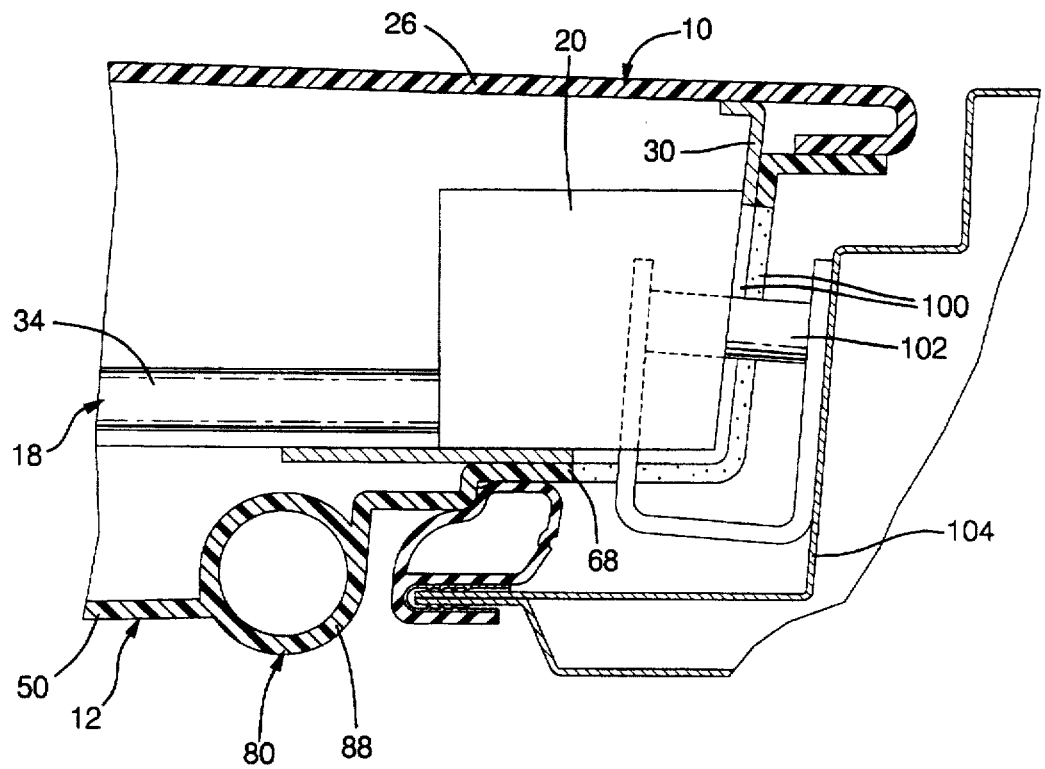
FIG. 5 is a section view through the door latch and taken in the direction of arrows 5—5 of FIG. 2.
Figure 6:
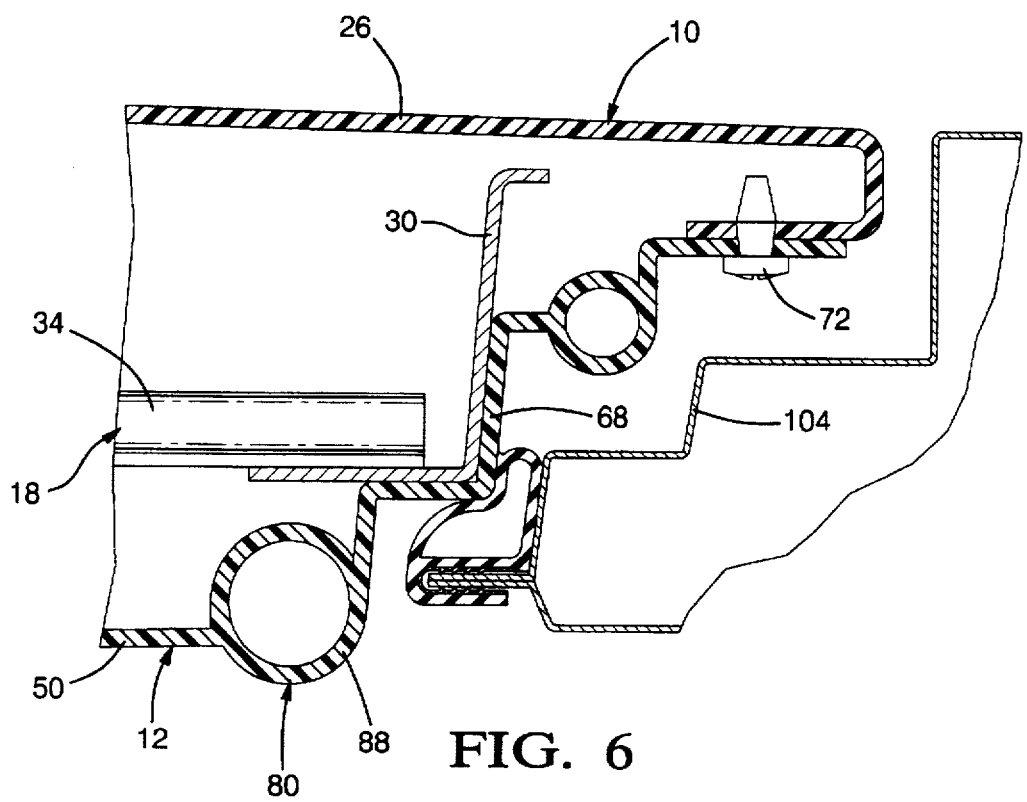
FIG. 6 is a section view taken in the direction of arrows 6—6 of FIG. 2.

As seen in FIG. 4, the trim panel 12 also includes a front edge wall portion 66 which extends step-wise and transverse to the planar trim wall 50. Furthermore, as seen in FIGS. 5 and 6, the rear end of the structural inner panel 12 includes a rear edge wall portion 68 which is integral with the planar trim wall 50 and extends step-wise generally transverse to the planar trim wall 50. It will be understood and appreciated that the edge wall portions 66 and 68 of the structural inner panel 12 cooperate with the planar trim wall 50 to substantially envelope and contain the structural framework 18 therein.

As best seen in FIGS. 3, 4, 5 and 6, the bottom edge wall portion 60, front edge wall portion 66 and rear edge wall portion 68 extend into engagement with the outer panel 26 to enable attachment of the outer panel 26 with the structural inner panel 12 via suitable fasteners such as push-pin 72 shown in FIG. 6 and the connecting hook 74 shown in FIG. 3. Additional fasteners or adhesives are employed as required.

Figure 2:
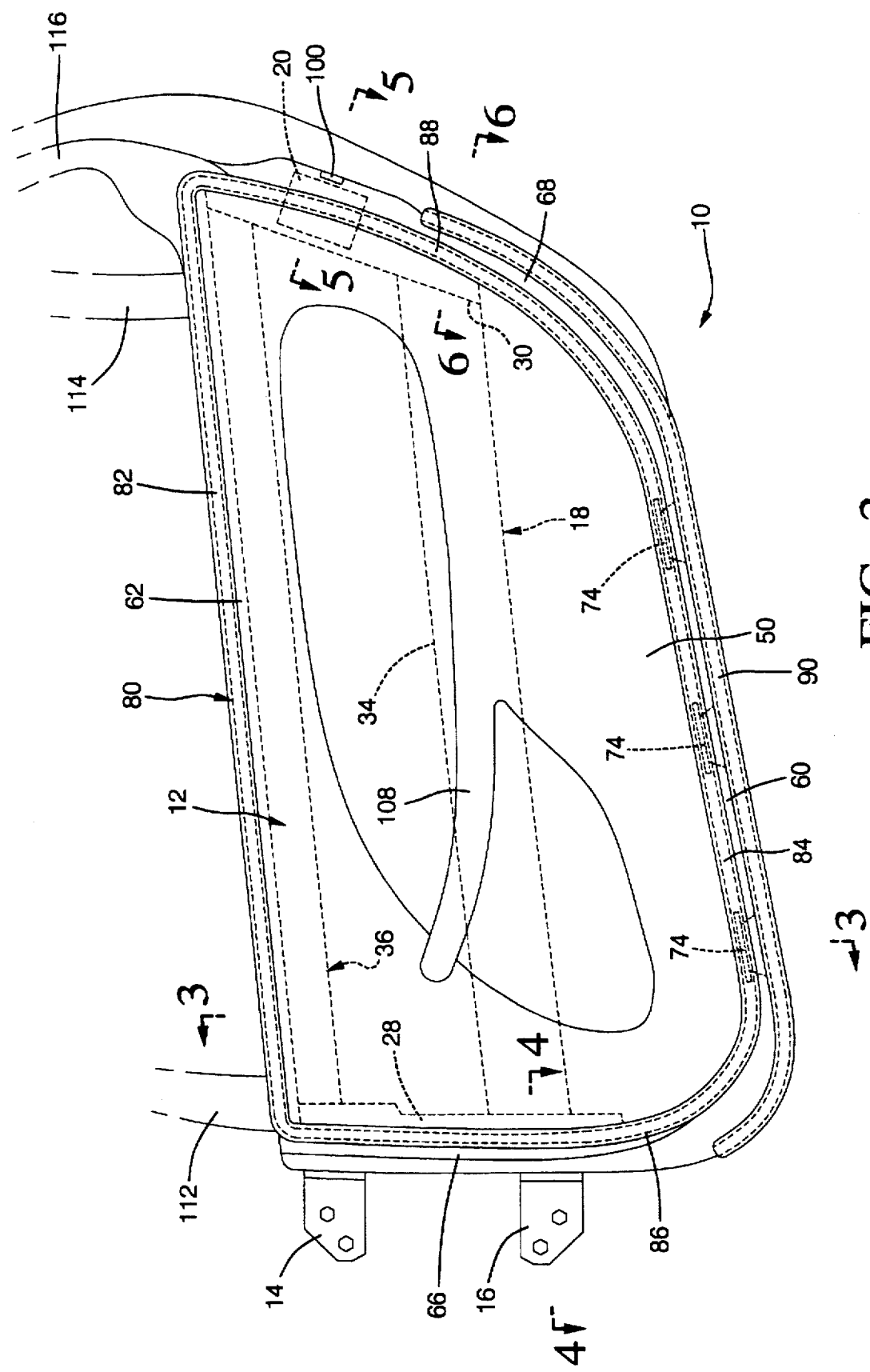
FIG. 2 is a perspective view of the vehicle door as viewed from inside the vehicle.

Referring to FIG. 3, it will be appreciated that the structural trim panel 12 does not overlie a metallic inner panel of the door which would structurally support the inner panel. Accordingly, the structural inner panel 12 is provided with hollow tubular stiffening structures which are provided therein via a gas assisted molding process. As best seen in FIG. 2, a hollow tubular stiffening structure, indicated generally at 80, extends substantially all around the periphery of the door including a top tubular segment 82, bottom tubular segment 84, front tubular segment 86 and rear tubular segment 88. These tubular segments are substantially continuous although interrupted by periodic blockages in accordance with the practice of gas assisted injection molding techniques.

As seen in the drawings, the bottom segment 84, front segment 86 and rear segment 88 are provided at the juncture between the planar trim wall 50 and the respective bottom edge wall 60, front edge wall 66 and rear edge wall 68 to substantially stiffen and strengthen the structural inner panel 12. On the other hand, the top segment 82 of the hollow tubular structure 80 is located adjacent the terminal edge of the top edge wall 62 to substantially stiffen the edge wall 62 along the window glass 24.

Referring again to the drawings, it is seen that an additional hollow tubular structure 90 is provided along the bottom-most edge of the lower edge wall 60 and extends at least part way up the front edge wall 66 and the rear edge wall 68 to substantially stiffen the lower, front and rear edge wall portions of the structural inner panel 12.

As best seen in FIG. 4, the front end of the door 10 is suitably connected to the vehicle body panel 94 by the hinges 14 and 16. In particular, the hinge 16 is connected with the door 10 by a bolt 96 which extends through the hinge 16, through the edge wall portion 66 of the inner panel 12 and through the front vertical 28 of the structural framework 18. Additional fasteners, not shown, are provided to complete the connection between the structural inner panel 12 and the front vertical 28 of the structural framework 18.

Referring to FIGS. 5 and 6, it is seen that the rear edge wall portion 68 of the structural trim panel 12 overlies the rear vertical 30 of the structural framework 18. Suitable fasteners, not shown, are installed therebetween in order to secure the structural trim panel 12 to the structural framework 18.

As best seen in FIG. 5, the door latch 20 is suitably attached to the vertical 30 of the structural framework 18 and registers with a fish mouth opening 100 provided in both the edge wall portion 68 of the structural trim panel 12 and the rear vertical 30 of the structural framework 18. A conventional striker loop 102 is mounted on the vehicle body pillar 104 and becomes captured by the latch 20 to latch the door assembly 10 in the closed position of FIGS. 5 and 6.

It will be appreciated and understood that the placement, size and dimensional extent of the tubular hollow structures can be modified within the teachings of this invention in order to provide the desired and sufficient level of structural support and rigidity for the door assembly.

Furthermore, it will be understood that the additional hollow tubular structures may be designed into the structural inner panel 12 as desired. For example, it may be convenient to employ such a hollow tubular structure to form a pull handle 108 into the structural trim panel 12.

In addition, if desired, additional hollow tubular structure may be provided to strengthen a window guide track 112 (FIG. 1) provided integrally at the front end of the structural trim panel 12, or to provide a window guide track 114 and vent window frame 116 at the rear end of structural trim panel 12.

It will be understood that the door inner trim panel 12 preferably has an inner surface which is aesthetically acceptable to obviate the need for covering the trim panel with a leather cloth or other coating. However, if desired, such a coating material may be employed to provide the desired aesthetic affects.

Thus, it is seen that the invention provides a new and improved vehicle door assembly in which a molded plastic inner panel envelopes an underlying structural framework and includes hollow tubular structures molded therein via gas assisted molding techniques in order that the trim panel will provide substantial structural self-support and integrity of the door assembly.

We claim:

1. A vehicle door assembly comprising:
   a structural framework including a rear end for mounting a latch, a front end for mounting a hinge, and a beam portion extending between the front and rear ends;
   a door outer panel for mounting on the structural framework; and
   a structural inner panel for mounting on the structural framework, said structural inner panel being of molded plastic and having a generally planar trim wall for facing toward the occupant compartment and edge wall portions extending transverse to the planar trim wall to envelope the structural framework within the structural inner panel; said structural inner panel further having a top edge wall defining a window opening, said structural inner panel having integrally molded hollow tubular stiffening structures molded thereinto and including a top tubular segment to substantially stiffen the top edge wall along the window opening, a bottom tubular segment, a front tubular segment and a rear tubular segment molded in place and extending substantially continuously all around the periphery of the door so that the molded plastic inner panel is substantially structurally self-supporting and contributing to the structural integrity of the door assembly.

2. The door assembly of claim 1 further characterized by the integrally molded hollow tubular stiffening structures having at least a portion thereof being located substantially at the juncture between the planar trim wall and the edge wall portions.

3. The door assembly of claim 1 further characterized by the integrally molded hollow tubular stiffening structures further including hollow tubular stiffening structure being located substantially at an edge of one said edge wall portion thereof.

4. The door assembly of claim 1 further characterized by at least one of by the edge wall portions of the structural inner panel extending into overlapping engagement with the outer panel at least along a substantial portion of the periphery thereof to enable attachment together of the structural inner panel and the outer panel.

\* \* \* \* \*